United States Patent [19]
Komori et al.

[11] Patent Number: 5,129,858
[45] Date of Patent: Jul. 14, 1992

[54] AIR-CONDITIONING GRILLE

[75] Inventors: Takahiro Komori; Kazuo Fujihara, both of Inazawa; Hiroshi Iwata, Nishikasugai; Toshihiko Mori, Nagoya, all of Japan

[73] Assignee: Toyoda Gosei Co., Ltd., Nishikasugai, Japan

[21] Appl. No.: 568,137

[22] Filed: Aug. 16, 1990

Related U.S. Application Data

[63] Continuation-in-part of Ser. No. 510,578, Apr. 10, 1990, abandoned.

Foreign Application Priority Data

Apr. 19, 1989 [JP] Japan .................................. 1-45860
Aug. 23, 1989 [JP] Japan .................................. 1-98155

[51] Int. Cl.$^5$ .............................................. B60H 1/34
[52] U.S. Cl. ...................................... 454/155; 454/320
[58] Field of Search ................... 98/2, 40.24, 40.26, 98/40.27

[56] References Cited

U.S. PATENT DOCUMENTS

| | | | |
|---|---|---|---|
| 2,735,351 | 2/1956 | Abrahamsem | 98/40.26 |
| 3,177,797 | 4/1965 | Kennedy | 98/40.24 |
| 4,665,804 | 5/1987 | Miyasaka | 98/2 |
| 4,905,580 | 3/1990 | Komori et al. | 98/2 |
| 4,957,036 | 9/1990 | Fujihara et al. | 98/2 |

FOREIGN PATENT DOCUMENTS

| | | | |
|---|---|---|---|
| 2200526 | 7/1973 | Fed. Rep. of Germany | 98/40.27 |
| 51-2849 | 1/1976 | Japan | |
| 51-6643 | 1/1976 | Japan | |
| 62-94160 | 8/1987 | Japan | |

*Primary Examiner*—Harold Joyce
*Attorney, Agent, or Firm*—Cushman, Darby & Cushman

[57] ABSTRACT

An air-conditioning grille comprises an inner case having an opening through which the wind blows out located in a wind blowing duct. In the duct, provided are plural wind deflecting plates which are bendable so as to make both the ends thereof extend substantially crossing the blowing direction. In the duct provided is a connecting member which connects the upstream ends of the wind deflecting plates together and restricts rotations of these connecting portions relative to each other. Also provided is an operation member to be operated to bend the wind deflecting plates. One transfer shaft is provided to transfer an operational force of the operation member, at the time of its operation, to the connecting member. In order to prevent the connecting member from rotating itself about the transfer shaft with operation of the operation member, rotation moments of the connecting member about the transfer shaft substantially cancel one another.

1 Claim, 3 Drawing Sheets

AIR-CONDITIONING GRILLE

This application is a continuation-in-part of our application No. 07/510,578 filed Apr. 10, 1990 abandoned.

BACKGROUND OF THE INVENTION

1. Field of the Invention

The present invention relates to an air-conditioning grille provided in automobiles or the like.

2. Description of the Prior Art

In general, the air-conditioning grille disclosed in Japanese Laid-Open Utility Model Publication No. 51-2849 has been well known as one mainly provided on the instrumental panel of an automobile. In this air-conditioning grille, plural wind deflecting plates made of leaf springs are fitted in a case while deformed in an arc shape. The wind deflecting plates are connected to an operation lever via a linkage composed of plural connecting members.

The operation lever gives pressure to said wind deflection plates via the linkage and their deformation states are adjusted, so that the closing direction of the wind introduced into the case is altered.

Moreover, there is another in which slits of V shapes in cross-sectional view are formed on both right and left sides of each of the above wind deflecting plates in a constant interval, so that the wind deflecting plates are more likely to be bent (Japanese Laid Open Utility Model Publication No. 51-6643).

In the above conventional air-conditional air-conditioning grille, however, a considerable amount of operation force is required to change the wind direction by bending the wind deflecting plates by means of the operation lever due to the arrangement of the operation lever and to the elasticity of the wind deflecting plates. When the wind deflecting plates are bent, there is a problem that twist and distortion occur on the wind deflecting plates due to their own elasticity. In this case, there occur problems that the stream of the wind is disturbed to generate vortexes and to make the alternation of the wind direction incomplete. Especially, the above problems outstandingly occur in use of the wind deflecting plates with the slits.

Moreover, if the strength and rigidity of each member and the precision of bearing portions of the wind deflecting plates or the like improve in order to solve the above problems, there occurs another problem that the weight or production cost of the whole air-conditioning grille increases.

In the above air-conditioning grille, the whole wind deflecting plates are formed of the leaf springs, so that they are not likely to be bent smoothly along predetermined arcs. Therefore, air introduction edges of the wind deflecting plates are not arranged on the same alignment of the air introduction direction, so that there is a problem that noises occur especially when the strong wind is to be blown.

Furthermore, the operation lever is connected to each of the wind deflecting plates via the linkage, so that the operation force is not evenly applied to each of the wind deflecting plates. Accordingly, the above described twists or the like are generated.

Moreover, on altering the wind direction, the operation lever has to be operated against frictional force at the bearing portions of the wind deflection plates and against their own elasticity. Therefore, not only a large operational force is required, but also the operational force increases as the bending degree of the wind deflecting plates increases.

On the other hand, if the frictional force at said bearing portions is not determined appropriately, namely if it is too small, the wind deflecting plates can not be retained at a certain position when the bending degree of the wind deflecting plates increases. It is difficult to design one meeting the above contradictory requirements.

SUMMARY OF THE INVENTION

Prior to this application, an air-conditioning grille for automobiles or the like is described in the U.S. patent application (Ser. No. 258,313 filed on Oct. 14, 1988 by Komori, et al.) filed by the inventors of the present application.

In the above air-conditioning grille, plural bendable wind direction adjusting plates are supported in the main body case. An extension plate is provided at an upstream edge of each of the wind direction adjusting plates, and coupling plates for connecting said extension plates to the wind direction adjusting plates are also provided. Moving means is provided to move said extension plates and coupling plates along a circular locus, and said locus has a shorter radius of curvature than a span between both edges of the wind direction adjusting plate while the wind direction adjusting plates are in a natural state (an unstressed configuration). Both edges of said coupling plates are operationally connected to the main body case via plural link members, and the link members restrict the moving range of the coupling plates.

When the moving means are operated, the operation force to the moving means is transmitted to each of the wind direction adjusting plates via the coupling plates, and the coupling plates are moved along said circular locus in the main body case. As a result, each of the wind direction adjusting plates can be smoothly bent according to the operation force and operation direction of the moving means.

However, in the above air-conditioning grille, the operation force is transmitted to each of the wind direction adjusting plates, so that a lot of parts such as the coupling plates and the link members or the like have to be used. Moreover, plural axes are used to connect each extension plate to each wind direction adjusting plate and to each coupling plate. Therefore, there is a problem that the number of the parts increases, the assemblage becomes troublesome, and the production cost increases.

The present invention is made to solve the above problems. An object of the present invention is to provide an air-conditioning grille in which plural wind deflecting plates can be smoothly bent along predetermined orbits, and therefore noises can be prevented especially even when a strong wind blows.

Another object of the present invention is to provide an air-conditioning grille in which the configuration for smoothly changing the wind direction can be simplified in order to simplify assembling procedures and to decrease the production cost.

In order to achieve the above objects, an air-conditioning grille comprises an air duct casing for passing air therethrough. The air duct casing has upstream and downstream ends.

A plurality of deflecting plates have upstream and downstream ends respectively. The downstream end of each deflecting plate is supported by the air duct casing.

A connecting member is disposed within said air duct casing for connecting the upstream ends of the deflecting plates together.

Moving means rotatably coupled to said air duct casing and operably coupled to said deflecting plates bend the deflecting plates in responce to movements of the moving means.

There is a single transfer shaft for coupling the connecting member to the moving means. Rotation moments about the transfer shaft that are generated by the deflecting plates substantially cancel one another.

Other objectives of the present invention will become apparent with an understanding of the embodiments discussed later, and the appended claims. Further, many advantages not mentioned in this specification will become obvious to one skilled in the art upon appreciation of the present invention.

BRIEF DESCRIPTION OF THE DRAWINGS

FIG. 1 is a plane sectional view of a portion of an air-conditioning grille showing second wind deflecting plates of a natural state (an unstressed configuration).

FIG. 2 is a plane sectional view showing the portion of the air-conditioning grille while the second wind delfecting plates are bent.

FIG. 3 is an enlarged sectional view taken along line III—III in FIG. 1.

FIG. 4 is a partially enlarged plane cross sectional view showing a configuration of the second wind deflecting plate.

DETAILED DESCRIPTION OF THE PREFERRED EMBODIMENTS

An air-conditioning grille, fitted in an instrumental panel of an automobile, of a first embodiment of the present invention is now described according to FIGS. 1 to 4.

Figure 1:
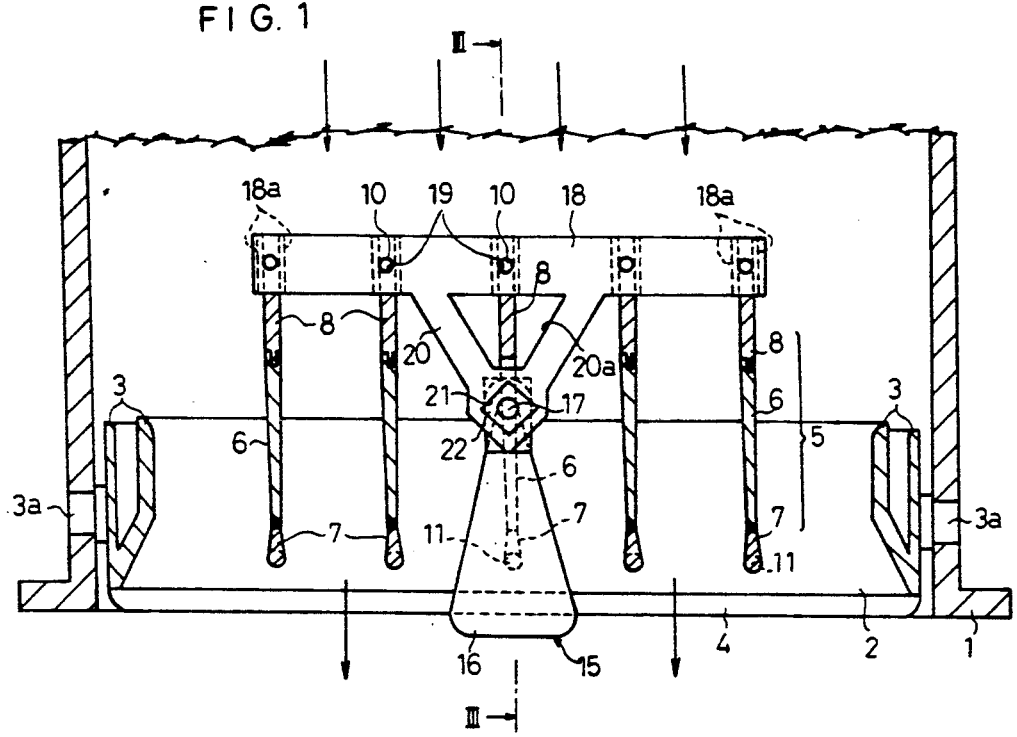
FIGS. 1 to 4 show an air-conditioning grille of a first embodiment of the present invention.
Figure 2:
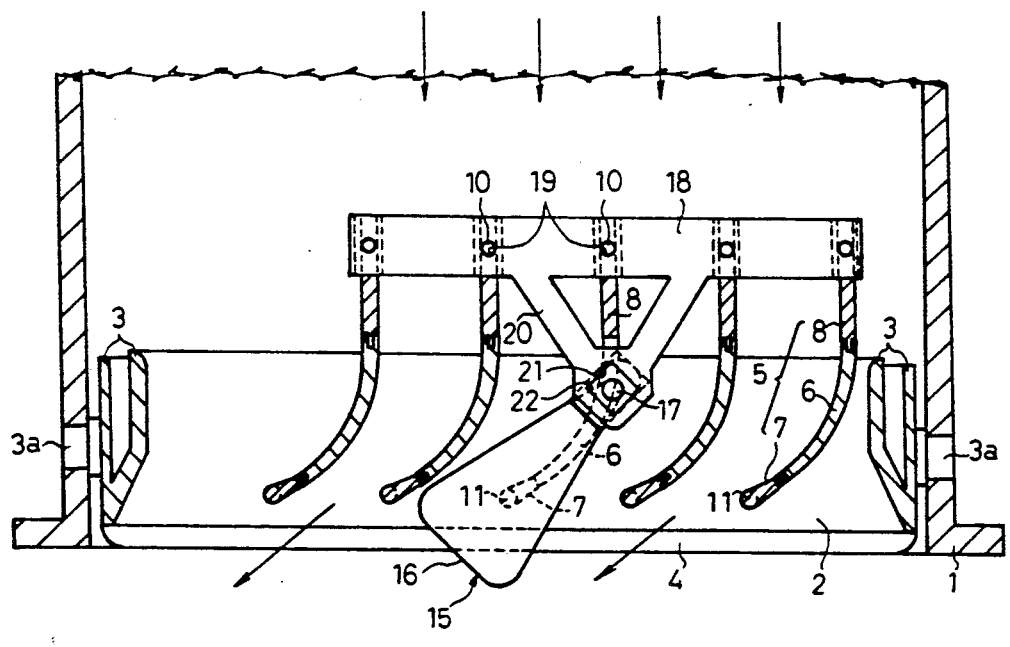

As shown in FIGS. 1 and 2, a wind blowing duct 1 is cylindrically shaped and has both front and rear ends open. An inner case 2 made of rigid resin is arranged at a front portion of the wind blowing duct 1. The inner case 2 is a substantially square pipe and has both front and rear ends opened. The inner case 2 is supported by said wind blowing duct 1 so as to be rotatable in an upward and a downward direction via shafts 3a outwardly projecting from both right and left sidewalls 3. A plurality of (four, in the present embodiment) first deflecting plates 4 made of rigid resin having long rectangular shape extending in a left and right direction are arranged between both front ends of the right and left side walls 3 at a constant vertical interval. An air duct casing comprises the wind blowing duct 1 and the inner case 2.

As shown as arrows in FIG. 1, the wind introduced from the rear end of the wind blowing duct 1 into the duct 1 is blown through the inner case 2 out of a front opening of the wind blowing duct 1 in the present embodiment.

Odd number (five, in the present embodiment) of second deflecting plates 5 are arranged behind the first deflecting plates 4 in said inner case 2 at a constant interval in a right and left direction so as to intersect with the first deflecting plates 4. Each of the second deflecting plates 5 comprises a rigid front portion 7 at a front side, namely at a downstream side of the wind, a rigid rear portion 8 at a rear side, namely at an upstream side of the wind, and a flexible portion 6 provided therebetween.

The flexible portion 6 is formed of flexible material like a thin plate, which is easy to bend, such as a rubber of chloroprene or the like, synthetic resin of polyvinyl chloride, of polypropylene, and of polyethylene, and metal of stainless steel or the like. Both the rigid portions 7 and 8 are formed of rigid material such as rigid resin, metal, and so on. In the present embodiment, flexible vinyl chrolide resin of hardness 30 (hardness A in JIS) is used as the flexible portion 6, and vinyl chrolide resin of hardness 95 (hardness A in JIS) is used as both the rigid portions 7 and 8.

Figure 4:
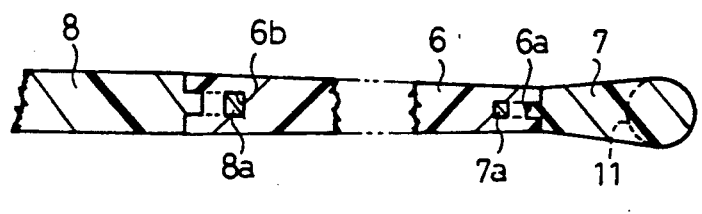

As shown in FIG. 4, ridge or tongue portions 7a and 8a are integrally formed at side edges, opposing each other, of both said rigid portions 7 and 8. On the other hand, engaging channels or grooves 6a and 6b are formed at front and rear side edges of said flexible portion 6 so as to be engaged with said ridge portions 7a and 8a. The ridge portions 7a and 8a of the rigid portions 7 and 8 are engaged in the engaging channels 6a and 6b of the flexible portion 6, and a part of each of the flexible portion 6 is fitted in a hole formed on each of the ridge portions 7a and 8a, so that both the rigid portions 7 and 8 are connected together by means of the flexible portion 6.

A rotating shaft 11 serving as a supporting point at the front edge of each of the second wind deflecting plates 5, is integrally formed at the rigid front portion 7 of each of the second deflecting plates 5. Both upper and lower ends of each rotating shaft 11 project upward and downward from each second deflecting plate 5. The rotating shafts 11 are made of rigid material such as metal and rigid synthetic resin or the like. Each of the second deflecting plates 5 is rotatably supported on upper and lower walls 12 and 13 of said inner case 2 by means of projecting portions of each rotating shaft 11.

A notch 9 opening rearward is formed in the middle of a read edge of each of the rigid rear portion 8. A connecting protrusion 10 extending upward is provided in this notch 9, and a supporting point of the rear edge of each of the second deflecting plates 5 is composed by the connecting protrusion 10.

Figure 3:
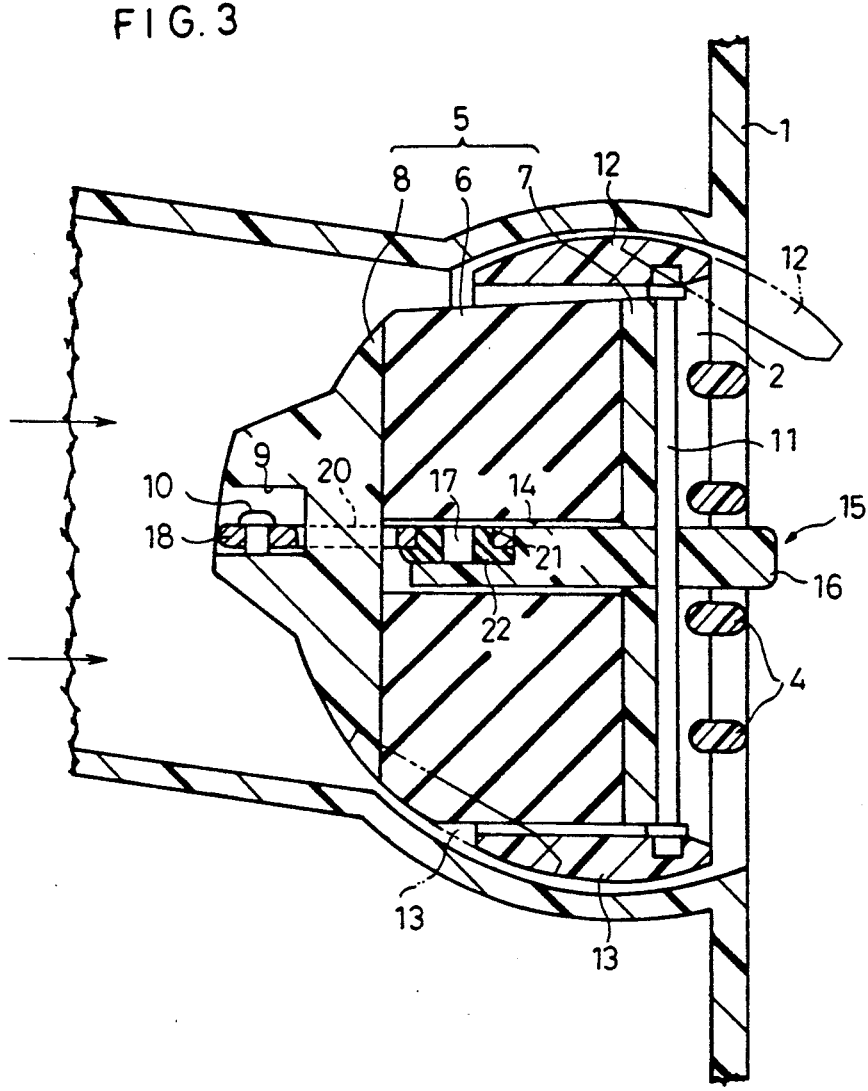

On the other hand, as shown in FIG. 3, a notch 14 extended forward and backward is formed at substantially the middle portion of the flexible portion 6 and rigid front portion 7 of a centrally located second deflecting plate 5 among five pieces of the plate 5. An operation member 15, served as moving means, made of rigid resin is arranged in this notch 14. This operation member 15 is inserted through said rotating shaft 11 substantially at the middle thereof and is supported rotatably on the middle of the rotating shaft 11. An operation lug 16 of a sector shape is integrally formed at a front end of this operation member 15. A notch is formed at a rear upper surface of this operation member 15, and a transfer shaft 17 projecting upward is arranged at this notch.

As shown in FIG. 1, a connecting member 18 of a plate shape extending in the right and left direction is arranged behind said inner case 2 so as to connect the rear edges of the second deflecting plates 5 to one another. Five holes 19 corresponding to each second deflecting plate 5 respectively are formed at this connecting member 18 at a constant interval. The connecting protrusions 10 of said second deflecting plates 5 are fitted upward into the holes 19 respectively. A pair of restricting protrusions 18a projecting downward are formed on said connecting member 18 for each of said second deflecting plates 5. Each pair of the restricting protrusions 18a hold the rigid rear portion 8 of each second deflecting plate 5 therebetween in order to restrict the rotation of the rigid rear portions 8 about the connecting protrusions 10.

A pair of extending portions 20 of the same length slantingly extending to said transfer shaft 17 are integrally formed at the middle of said connecting member 18, and both of the extending portions 20 are connected to each other at their intersecting portion. The connecting portion of both the extending portions 20 has an engaging hole 21 made therethrough, and the transfer shaft 17 of said operation member 15 is engaged into said engaging hole 21 while having its outer periphery covered with a bush 22.

A clearance 20a is provided between extending portions 20 so that the rigid rear portion 8 of the centrally located second deflecting plate 5 is assembled to the connecting member 18. In addition, in the present embodiment, a distance between the rotating shaft 11 inserted into the operation member 15 and the transfer shaft 17 is determined shorter than that between the rotating shaft 11 of each of the second deflecting plate 5 and the rear side edge of the corresponding flexible portion 6 in the natural state.

Operation of the air-conditioning grille configured as described above is now described.

FIG. 1 shows that the operation lug 16 of the operation member 15 is located in a neutral position. At this time, no stress is applied to the second deflecting plats 5, and the plates 5 are in the natural state and are arranged in parallel with one another along the wind introduction direction.

In this state, when the wind indicated by the arrows in FIG. 1 is introduced into the wind blowing duct 1, this wind goes the second deflecting plates 5 and the first deflecting plates 4 and blows straight forward out of the front opening of the wind blowing duct 1.

On the other hand, as shown in FIG. 2, when the operation member 15 is pressed, for example, leftward to be rotated about the rotating shaft 11, the operation force moves said connecting member 18 rightward along a predetermined arc orbit via said transfer shaft 17, bushing 22, and extending portions 20.

At this time, the connecting member 18 approaches the rotating shafts 11 of the second wind deflecting plates 5 and makes the distance between the connecting member 18 and each rotating shaft 11 shorter. Therefore, as shown in FIG. 2, the flexible portions 6 of the second deflecting plates 5 bend rightward against their own elasticity.

In this state, a reaction force is applied to the connecting member 18 because of the elastic returning force of the flexible portions 6 of the second wind deflecting plates 5. In this embodiment, however the bushing 22 is inserted between the transfer shaft 17 and the connecting member 18, so that its frictional force prevents the connecting member 18 from returning back caused by said reaction force.

In this embodiment, the connecting member 18 and the second deflecting plates 5 are arranged to the right and left of the transfer shaft 17. Accordingly, the rotation moment of the connecting member 18 generated around the transfer shaft 17 due to said reaction force is the same at both right and left portions of the connecting member 18, and the sum amount of the rotation moment reacting on the connecting member 18 becomes zero. Therefore, the connecting member 18 never rotates itself about the transfer shaft 17, and with an operation of the operation member 15, the connecting member 18 moves in parallel from a position shown in FIG. 1 to a position shown in FIG. 2 and can be retained there.

When the wind is blown in the above state where the position of the second deflecting plates 5 is altered, the wind is blown out along the bent second deflecting plates 5 in the direction indicated by arrows (leftward) in FIG. 2.

On the other hand, when the operation member 15 is rotated in the direction reverse to said direction, the second deflecting plates 5 bend leftward and the wind can be blown out in the direction (rightward) opposite to said direction.

In the air-conditioning grille of the present embodiment, when the operation lug 16 is rotated upwardly or downwardly (in or out of the paper in FIG. 1) relative to the wind blowing duct 1, the whole inner case 2 rotates about the shaft 3a relative to the wind blowing duct 1, thus the wind blowing direction can also be adjusted upwardly or downwardly.

As described above, in the air-conditioning grille of the present embodiment, the curvable second deflecting plates 5 are provided in the odd number (five), and the operation member 15 is arranged at the centrally located second deflecting plate 5. Thus this centrally located second deflecting plate 5 can bend as well as the other second deflecting plates 5, and moreover its design can bring about a proportional front side appearance of the grille.

In the present embodiment, the rotation of each second deflecting plates 5 relative to the connecting member 18 is restricted by engagement of the rigid rear portion 8 and the restricting protrusions 18a. Therefore, even if the second deflecting plates 5 bend in any direction, the rear edges of the second deflecting plates 5 are always arranged in parallel along the blowing direction. Consequently, noises do not occur even when the strong wind is blown out.

In the present embodiment, in order to bend each of the second deflecting plates 5, all that is required are the bushing operation member 15, the connecting member 18, and the bushing 22. Therefore a complicated system such as a parallel linkage or the like does not have to be used, and the second deflecting plates 5 can be smoothly bent for sure. It can also be assembled easily with a few parts.

[SECOND EMBODIMENT]

Figure 5:
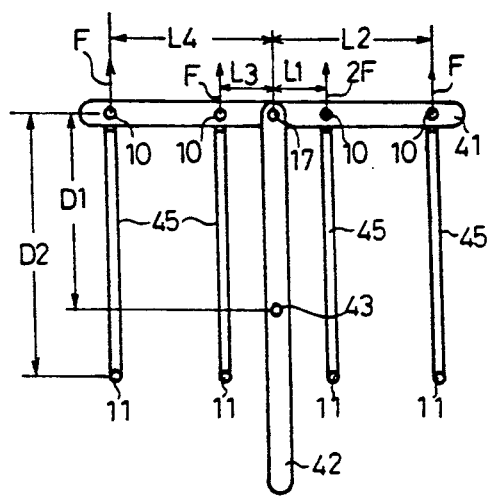
FIG. 5 is a plan view showing a connecting configuration of second wind deflecting plates of an air-conditioning grille of a second embodiment.

A second embodiment showing an operating principle of second wind deflecting plates according to this invention is now described referring to FIG. 5 mainly discussing the difference from said first embodiment.

In this second embodiment, provided are four pieces of second deflecting plates 45 which are all made of flexible synthetic resin. A connecting rod 41 having rigidity is used as a connecting member, and this connecting rod 41 connects, as well as said first embodiment, edges of the second deflecting plates 45 together via the connecting protrustions 10 or the like.

An operation member 42 of a bar shape is arranged between two centrally located second deflecting plates 45 and is rotatably supported on said inner case 2 by means of a supporting shaft 43 at substantially a central portion thereof. As well as said first embodiment, a connecting mechanism having the transfer shaft 17 is provided between this operation member 42 and said connecting rod 41.

Intervals L1, L2, L3, and L4 between said transfer shaft 17 and the connecting protrusions 10 of the second deflecting plates 45 are set such as L1=L3, and L2=L4, to make them the same at both to the right and left of the operation member 42. A distance D1 between both the shafts 17 and 43 of the operation member 42 is set at about ⅓ of a distance D2 between the connecting protrusion 10 and the rotating shaft 11 of each of the second wind deflecting plates 45 in the natural state.

Accordingly, in this embodiment as well as said first embodiment, the second deflecting plates 45 are all bent with the rotation of the operation member 42 via the connecting rod 41 or the like.

It it is called a primary condition that the connecting rod 41 has moved in parallel, reaction forces F applied to the connecting portions of the second deflecting plates 45 and the connecting rod 41 is a constant value, because all the second deflecting plates 45 have the same configuration. Therefore the rotation moment Mr at a right side of the transfer shaft 17 of the connecting rod 41 can be expressed in the following formula.

$$Mr = L1 \cdot F + L2 \cdot F$$

On the other hand, the rotation moment M1 at a left side of the transfer shaft 17 of the connecting rod 41 can be expressed in the following formula.

$$M1 = L3 \cdot F + L4 \cdot F$$

Said intervals are as L1=L3, and L2=L4, so that the rotation moments Mr and Ml at both right and left sides of the connecting rod 41 become equal. Therefore, said primary condition where the connecting rod 41 has moved in parallel is stable, and the connecting rod 41 will not be rotated about the transfer shaft 17.

[MODIFIED EXAMPLE OF SECOND EMBODIMENT]

Figure 6:
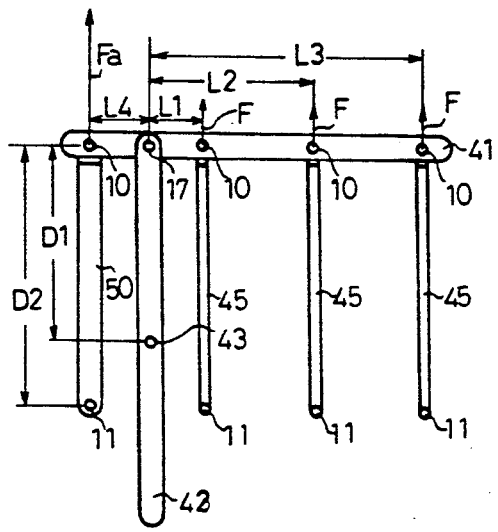
FIG. 6 is a plan view showing a connecting configuration of second wind deflecting plates of a modified example of said second embodiment.

As shown in FIG. 6, a modified example of the second embodiment is different from said second embodiment in the following points. In this modified example, the operation member 42 is arranged between a second wind deflecting plate 50 located in the leftmost position and the second deflecting plate 45 located next thereto.

A thickness of the second wind deflecting plate 50 located at the leftmost position is set thicker than those of the other second deflecting plates 45, and a reaction force Fa of the second wind deflecting plate 50 is set 9 times larger than reaction forces F of the other second deflecting plates 45.

Ratios of intervals between the transfer shaft 17 and the connecting protrusions 10 are set as L1:L2:L3:L4=1:3:5:1.

Therefore, the rotation moment Mr at a right side of the transfer shaft 17 of the connecting rod 41 is expressed in the following formula.

$$Mr = L1 \cdot F + L2 \cdot F + L3 \cdot F = F(L1 + L2 + L3)$$
$$= F \times 9 \cdot L1$$

On the other hand, the rotation moment M1 at a left side of the transfer shaft 17 of the connecting rod 41 is expressed in the following formula.

$$M1 = L4 \cdot Fa = L1 \times 9 \cdot F$$

Accordingly, the rotation moments Mr and M1 at both the right and left sides of the connecting rod 41 become equal, so that the connecting rod 42 will never be rotated about the transfer shaft 17 after the wind direction has been altered.

[THIRD EMBODIMENT]

Figure 7:
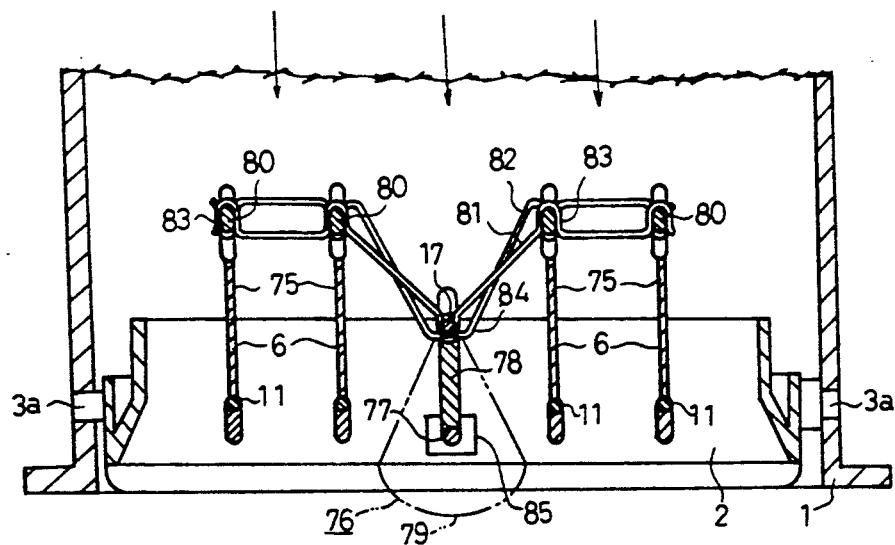
FIG. 7 is a plane cross sectional view of a portion of an air-conditioning grille showing a connecting configuration of second wind deflecting plates of an air-conditioning grille of a third embodiment.

A third embodiment of the present invention is now described referring to FIG. 7. In the present embodiment, configurations of second wind deflecting plates, a connecting member, and an operation member are different from said embodiments. Namely, four pieces of second wind deflecting plates 75 are provided at an interval in the right and left directions so as to extend vertically behind and crossing the first deflecting plates 4 in said inner case 2. Each second deflecting plate 75 has substantially the same configuration as those of said first embodiment and is supported on the inner case 2 by means of the rotating shaft 11.

An operation member 76 made of rigid synthetic resin is arranged between two centrally located second deflecting plates 75. A rotating shaft 77 is provided at a center portion of this operation member 76, and the operation member 76 is rotatably supported on the inner case 2 by means of both upper and lower ends of the rotating shaft 77 via a bushing 85 which gives a rotational friction.

This operation member 76 has a rigid deflecting plate 78, which extends vertically along the rotating shaft 77 and protrudes backward, and an operation lug 79 which protrudes forward rather than the inner case 2.

The transfer shaft 17 for transferring an operational force of the operation member 76 to the second deflecting plates 75 is arranged substantially at a center of a rear portion of said rigid wind deflecting plate 78.

A connecting protrusion 80 is provided on each said second deflecting plate 75 in order to connect the operation member 76 and each of the second deflecting plates 75, and has substantially an elliptical shape in a cross section.

A connecting member comprises a pair of upper and lower wires 81 and 82. The wires 81 and 82 are made of metal material having a small diameter, and are given rigidity by being quenched.

Four fixing portions 83 having a respective U shape in a plan view are formed on each of the wires 81 and 82 at a predetermined interval corresponding to the connecting protrusions 80 of said second deflecting plates 75. One fixing portion 84 of an arc shape in a plan view is formed at a center of each of the wires 81 and 82 corresponding to the transfer shaft 17 of the rigid wind deflecting plate 78.

Each of the U shaped fixing portions 83 of the wire 81 is engaged to the front side of each of the connecting protrusions 80 of the second deflecting plates 75, while the U-shpaed fixing portions 83 of wire 82 are engaged to the back side of the connecting protrusions 80. Thus the wires 81 and 82 and the second deflecting plates 75 are connected together while a rotation is restricted relative to each other.

A relative rotation of the wires 81 and 82 to the operation member 76 is allowed because each of the arc shape fixing portions 84 of the wires 81 and 82 is respectively engaged to the front and back sides of said transfer shaft 17.

In the above connecting state, distances between the transfer shaft 17 and the connecting protrusions 80 of the second deflecting plates 75 are set symmetrically to the right and left of the transfer shaft 17.

Therefore, in this third embodiment as well as said first embodiment, when the operation member 76 shown in FIG. 7 is rotated about the rotating shaft 77 in a predetermined direction, its operational force moves said wires 81 and 82 along a predetermined arc orbit via said transfer shaft 17.

Then the flexible portions 6 of the second deflecting plates 75 bend against their own elasticity, so that the blowing direction can be altered.

At this time, reaction forces caused by the second deflecting plates 75 are applied to the wires 81 and 82. However, in this embodiment, rotational friction by a bushing 85 arranged between the rotating shaft 77 and the inner case 2 is given to the operation member 76, so that returning back of the second deflecting plates 75 due to said reaction forces is prevented.

Distances between the transfer shaft 17 and the connecting protrusions 80 of the second deflecting plates 75 are set symmetrically to the right and left of to the transfer shaft 17, and configurations of the second deflecting plates 75 are made the same. Thus a sum amount of the rotation moments about the transfer shaft 17 reacting on both the wires 81 and 82 becomes substantially zero. Accordingly, both the wires 81 and 82 never rotate themselves about the transfer shaft 17 after the second wind deflecting plates 75 bend.

This invention is not limited to the configurations of said embodiments, and for example can be modified as described below without departing from the scope of the invention.

(1) The orientations of the first and second deflecting plates can be reversed. Namely, first deflecting plates extend vertically, and second deflecting plates extend right and left.

(2) The inner case can be removed. In this case, the rotating shafts of the second deflecting plates are directly fitted to the wind blowing duct.

(3) The air-conditioning grille of the present invention can be used for other than instrumental panels of automobiles, for example, blowing portions of home heaters and of air conditioners.

(4) Instead of the bushing of said first embodiment, a member which gives a frictional resistance to the operation member 15 can be provided between the first deflecting plates 4 and the operation lug 16.

(5) Either one of the wires 81 and 82 of said third embodiment can be removed. The diameter of each of the wires 81 and 82 can be made larger, and a quenching procedure can be deleted. (6) Driving means such as a motor can be additionally provided so as to revolve the transfer shaft 17 about the rotating shaft 77 in said third embodiment.

What is claimed is:

1. An air-conditioning grille comprising:
   an air-duct casing for passing air therethrough, said air duct casing having upstream and downstream ends;
   an odd number greater than 1 of identical wind deflecting plates each having upstream and downstream ends, said downstream end of each of said deflecting plates being supported by said air duct casing;
   a connecting member disposed within said air duct casing for connecting said upstream ends of said deflecting plates together;
   moving means rotatably coupled to said air duct casing, said moving means being operably coupled to said deflecting plate so that said deflecting plates are bent in response to movements of said moving means, said moving means having a rotating axis located on a rotating axis of said downstream end of said deflecting plate that is located centrally in said plurality of deflecting plates; and
   a single transfer shaft for coupling said connecting member to said moving means, said deflecting plates being disposed symmetrically about said transfer shaft;
   wherein rotation moments about said transfer shaft that are generated by said deflecting plates substantially cancel one another; and
   wherein a notch is formed on said centrally located deflecting plate with one side of said moving means being disposed in said notch and the other side of said moving means protrudes outwardly from said air duct casing.

* * * * *